June 6, 1961

T. H. HINCHCLIFFE 2,987,169

CONVEYOR BELT CLEATS

Filed Sept. 1, 1959

INVENTOR.
THEODORE H. HINCHCLIFFE
BY W. Glenn Jones
ATTORNEY

June 6, 1961 T. H. HINCHCLIFFE 2,987,169
CONVEYOR BELT CLEATS
Filed Sept. 1, 1959 2 Sheets-Sheet 2
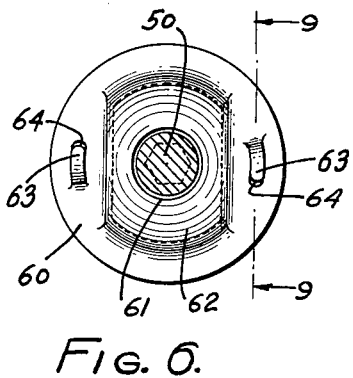
FIG. 6.
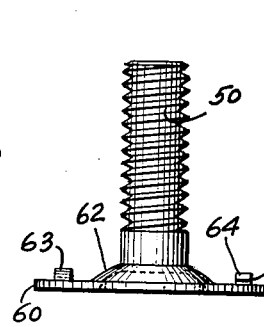
FIG. 7.
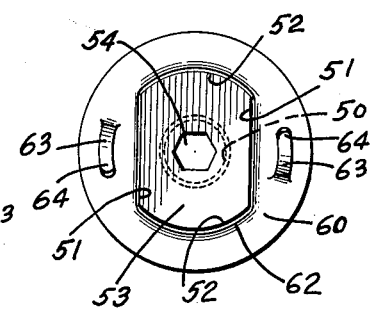
FIG. 8.
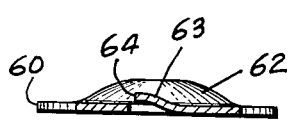
FIG. 9.
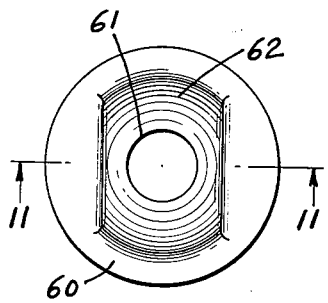
FIG. 10.
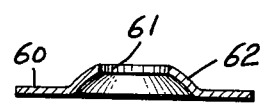
FIG. 11.
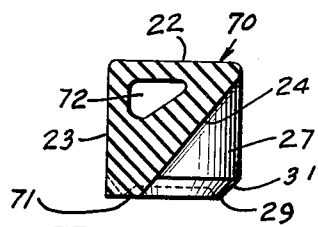
FIG. 12.
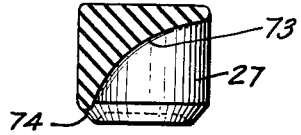
FIG. 13.
FIG. 15.
FIG. 14.
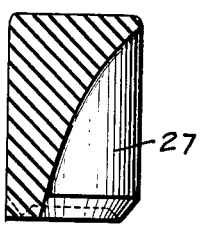
INVENTOR.
THEODORE H. HINCHCLIFFE
BY W. Glenn Jones
ATTORNEY United States Patent Office 2,987,169
Patented June 6, 1961

2,987,169
CONVEYOR BELT CLEATS
Theodore H. Hinchcliffe, 1450 La Loma Road,
Pasadena, Calif.
Filed Sept. 1, 1959, Ser. No. 837,549
6 Claims. (Cl. 198—199)

This invention relates to improvements in belt conveyors and particularly to improvements in the generally transversely disposed cleats usually carried by such conveyor belts.

In the common practice of assembling conveyor belts as used in the agricultural, milling, mining, and various other manufacturing processes, it is customary to provide variously shaped cleats fastened directly to the belts by means of simple bolts, screws or other similar fastenings. These cleats are generally made of metal, wood, or such other inflexible materials and, therefore, cannot bend or yield when passing around or over the rollers and crowned drive pulleys on which the belt is suspended. This inflexibility results in a wearing and enlargement of the bolt holes in the belt which results in its progressive weakening and, usually, the loss of a good share of the cleats. Such cleats are usually flat-bottomed, i.e., the base adjacent to the belt is co-planar therewith. As wear occurs in the bolt holes in the belt, or as the bolts or screws become loosened by vibration, the cleats tilt away from the direction of travel of the belt and particles or parts of the material being conveyed lodge under the flat base of the cleats. This action accelerates the separation of the cleats from the belt and rupture of the belt.

Some conveyor belts are being supplied with flexible cleats. Such cleats are constructed as part of the belt itself; the bases thereof being intermixed with the plies or covers of the belt and further cemented or vulcanized into place. Such cleated belts are very bulky and are difficult to ship or transport from place to place. These types of cleats are fixed in pitch, i.e., distance from one cleat to the next, and in linear dimension, usually the width of the belt. Any attempt to change the linear dimensions of such cleats usually results in injuring the cleats and the surface of the belt leading to its early destruction.

The primary object of my invention, therefore, is to provide separate flexible cleats which may be easily attached to a conveyor belt in the field and which may be removed with equal facility without damaging cleats or belt, as the need arises.

Another object of my invention is to provide flexible cleats of varying degrees of elasticity or resiliency whereby one type of cleat which has been used for one purpose may be replaced by another type of cleat for a different purpose, such differences involving degree of elasticity or resiliency, weight, height, length, and number of fastenings to the belt. Obviously, this ability to change from one form of cleat to another conserves the comparatively expensive belts and extends their usefulness to all practical limits.

A further object of my invention is to provide flexible cleats which may be securely fastened to the conveyor or elevator belts so as to minimize or actually eliminate any wear on the belt at the cleat fastening holes. Such effect is due, partially, to the configuration of the base.

A still further object of my invention is to provide self-locking fastening means whereby the cleat is securely fastened to the belt and whereby such fastening means cannot be loosened by vibration or other operational forces.

Other objects and advantages of my invention will be better understood in view of the following description and drawings wherein:

FIG. 6 is a plan view taken on the line 6—6 of FIG. 2;

FIG. 7 is an elevation of part of the fastening means;

FIG. 8 is a bottom plan view of the parts shown in FIG. 7;

FIG. 9 is an elevation, partly in cross-section, of one of the fastening means taken on the line 9—9 of FIG. 6;

FIG. 10 is a bottom plan view of the part shown in FIG. 11;

FIG. 11 is a cross-section of a modified form of fastening means; and

FIGS. 12–15, inclusive, are cross-sectional elevations of various forms of cleats.

Figure 1:
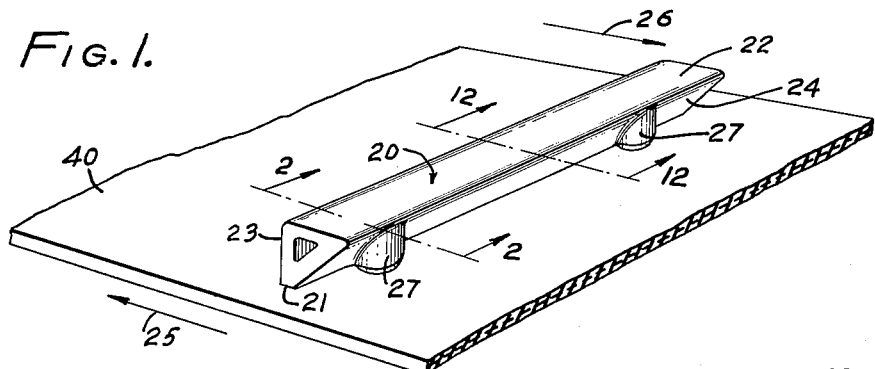
FIGURE 1 is a view in perspective showing one of my cleats installed on a section of conveyor belting.

With reference to FIG. 1, my improved cleat 20 is shown located transversely of belt 40. Cleat 20 may be formed of rubber, rubber substitute, leather, hard pressed felt, certain plastics, or other similar resilient materials. The conveyor belt 40 may be made of any of the materials used for such belts as treated canvas, leather, rubber, synthetic rubber, textiles, or various combinations thereof.

Cleat 20 may be generally right triangular in cross-section with its inverted truncated apex 21 disposed adjacent to the planar surface of the belt 40 and its inverted base 22 generally parallel to the surface of the belt. The side 23 which is normal to the base is thus substantially normal to the plane of the surface of the belt. Angular side 24 is disposed at an acute angle to the belt surface. Thus when the belt 40 is moving in the direction of the arrow 25, normal side 23 is the load bearing side and is suitable for objects of a discrete size. When grain or small particles are to be conveyed, the belt can be given the reverse direction, as shown by arrow 26, whereupon the angular side 24 becomes the load bearing side, thus forming a triangular shaped pocket between the cleat and the belt.

Cleat 20 is provided with cylindrical abutments or belt gripping portions 27. These abutments not only furnish lateral stability and reinforcement to the cleat but have further important functions related to the fastening of the cleat to the belt. Abutments 27 are provided with a shallow truncated conical cavity 28 having a protruding circular rim or belt gripping projection 29. It will be noted that the diameter of the rim 29 is less than that of the cylindrical abutment 27; also, that the internal angle 30 of the rim with the surface of the belt is less (more acute) than the corresponding external angle 31. Obviously, as the compression of the cleat on the belt is increased, this rim 29 depresses the surface of the belt to a slight extent and, due to the angular relationships, the rim is forced outwardly, thus creating a watertight, pressure seal between the cleat abutment and the belt. This seal, in turn, prevents any material getting under the cleat at the point of its attachment to the belt, thus obviating any rocking or working of the cleat which would result in undue wear of the belt and deterioration of the screw holes in the belt.

Figures 2, 4, 5:
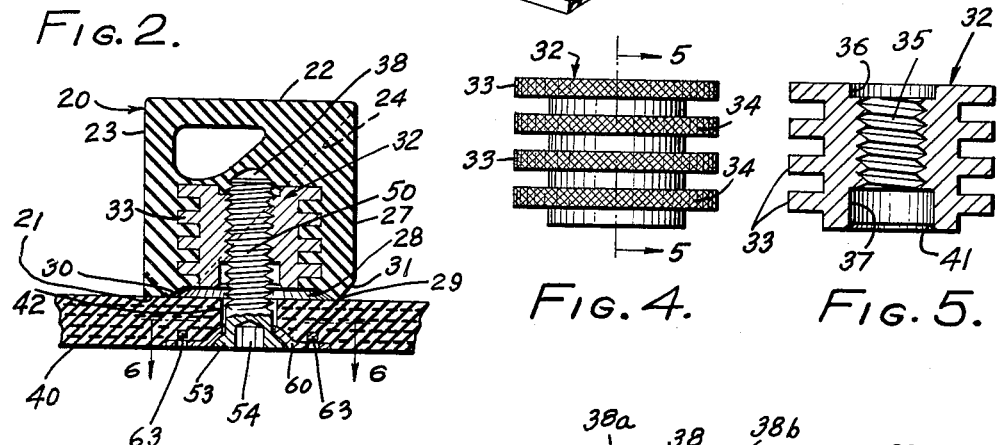
FIG. 2 is a cross-section taken on the line 2—2 of FIG. 1 showing the fastening means.
FIG. 4 is an enlarged view of part of the fastening means.
FIG. 5 is a cross section taken on line 5—5 of FIG. 4.

As shown in FIG. 2, a finned insert 32 is molded into each cylindrical abutment 27. This insert is generally coaxial with the abutment and may be of metal, plastic, or other suitable material. The fins 33 may be provided with external knurled portions 34. The fins and the knurled portions furnish efficient keys for keying the insert into the molded cleat material. Such precautions are necessary in order to resist the compressive forces set up by the cleat-to-belt fastening means as well as to reinforce the cleat against the lateral strains set up by the load.

Figure 3:
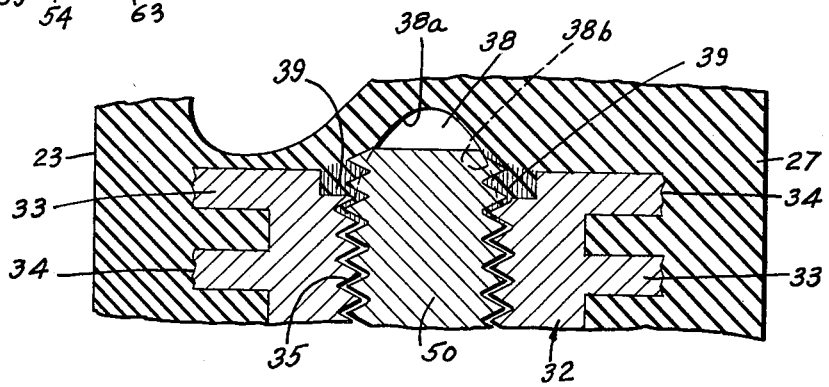
FIG. 3 is an enlargement of part of the view shown in FIG. 2.

These inserts 32 are provided with a threaded bore 35 and concentric counter bores 36 and 37 at the upper and lower ends of the threaded bore 35. As shown in Fig. 3, upper shallow counterbore 36 allows the molded material to flow ajacent to the threaded bore 35 so that the material will engage the upper threads of the compression screw 50 as they protrude through the insert into the molded cavity 38. This latter cavity is molded in a general ogival shape as shown by the solid line 38a and its continuation, the dotted line 38b. If, due to vibration or other causes, the screw 50 tends to unscrew, it would commence to descend. The molded material filling the upper grooves of the screw would tend to flow downwardly between the screw threads of the screw and the threaded bore, as shown by the shaded area 39, and also compresses against the wall of the counterbore. This flow of molded material between the screw threads and compression in the upper counterbore would tend to lock the screw and prevent its further rotation and descent. In order to promote this self-locking feature, the screw 50 may be made with a suitable fit into the threaded bore of the insert. It should be carefully noted that this self-locking feature is quite distinct from that employed by the so-called self-locking nuts that are common in industry. These nuts are generally provided with a hard rubber or fiber threaded insert located in the upper part of their threaded bore. When the screw or bolt is threaded upwardly into the nut, or the nut is threaded downwardly onto the screw, the threads of the latter are partly engaged by the metal threads of the nut proper and the threads in the fiber insert. Then as the screw is tightened into the nut, compressive forces are set up. The difference between the reactions of the two materials, i.e. fiber and metal, to the compressive forces establish the type of self-locking action there provided. There is no flow of the fiber insert into the metal nut portion. In other types of such self-locking nuts, the thread of the fiber insert is made finer than that of the metal bore which causes the screw or bolt to bind itself into the fiber insert. Again, there is no flow of material downwardly between the thread of the screw and the threads of the metal portion of the nut.

Lower counterbore 37 is deeper than the upper counterbore 36 and is furnished with a chamber 41. This construction is provided for the easy insertion of the screw 50 through the hole 42 in the belt into the threaded insert 32.

While the self-locking means described above have been found efficacious under certain conditions, it has also been found that, under heavy loads and high speeds of belt travel, further locking means are necessary to prevent the screws 50 being loosened from the increased vibration. These further locking means entail the use of special headed screws and coacting locking washers.

Thus, screw 50 is similar to a socket-headed flat screw except that two segments have been removed from the circular end or head surface resulting in two straight sides 51 connected by two circular arcs 52 as shown in FIGS. 6 and 8. For the purposes of the further description of this part of the fastening means, this construction of the screw head shall be termed—the segmented head 53. As shown, this head 53 is provided with a socket 54 which may be usual hexagonal Allen socket or may be of any other suitable configuration for the reception of a correspondingly shaped wrench (not shown).

Dished washer 60, as variously shown in FIGS. 2, and 6 to 9, inclusive, is provided for use between the segmented head 53 and the under surface of the belt. This washer is generally circular in shape and is provided with a central hole 61 of a size corresponding to the diameter of the screw 50. A dished portion 62 is formed by forging or stamping into the washer which dished portion is shaped to receive the segmented head 53 of the screw 50. Approximately centrally between the straight sides of the dished portion and the outer circular periphery and on a diameter thereof, the washer is provided with two prongs 63 which extend upwardly, away from the flat surface of the washer, i.e., in the same direction as that of the dished portion with relation to the washer's circular periphery or the plane defined thereby. These prongs may also be formed by stamping or punching at the same time the dished portion is formed. It is to be noted that these prongs are so formed that when the washer is rotated clockwise with the screw 50, it may be turned fairly easily. When the screw and washer is screwed home into the insert 32 and the under surface of the belt, the raised or protruding ends 64 of the prongs dig into the belt and resist any ordinary counter clockwise rotation of the screw and washer. When it becomes necessary to remove the cleat, however, an application of force by means of the furnished wrench will force the washer and screw to rotate counter clockwise for their removal from the cleat and belt. As indicated above, however, this type of configuration of screw head and mating pronged washer is proof against any forces of vibration which might otherwise tend to loosen the screw from the cleat.

Where the vibration forces are lighter and yet full reliance cannot be placed on the self locking feature described with relation to the action of the screw drawing the molded material down into the upper threads of the insert, a modified form of dished washer may be used as shown in FIG. 11. This washer is similar to the one previously described with the exception that no prongs are provided in the rim. When this washer is used, the natural friction forces between the washer and the material of the belt is generally sufficient to keep the screw from rotating counter-clockwise under light conditions of vibration. This feature is of course additive to the effect of the self-locking feature previously described.

FIGURES 12 to 15, inclusive, illustrate various cross-sections of cleats that may be used. FIG. 12 shows a low cleat 70 in the form of a truncated right triangle with the flattened apex 71 forced into close relationship with the surface of the belt. Furthermore, this type of cleat may be cored, as at 72, for the purpose of lightening the cleat. While this cored aperture is shown as generally triangular in shape, it may be circular, elliptical, or any other convenient geometrical configuration.

FIG. 13 depicts another form where the hypotenuse of the right triangle becomes a concave curve 73. This is done so that the cleat is made lighter and when handling small fruit, for instance, the concave surface of the cleat forms, in conjunction with the belt surface, a more definite pocket. In this form, the apices of the triangle are rounded off and the lower apex 74 is raised from the belt surface, thus facilitating cleaning of the cleat and the adjacent belt surface by pressurized fluid means.

FIG. 15 illustrates a form of cleat with an increased height. FIG. 14 shows a form of cleat similar to that shown in FIG. 12 except for the cored aperture. It is to be noted that, regardless of the cross-sectional configuration of the cleat, all cleats are provided with abutments 27 for securing the cleat to the belt. It should be further understood that while these abutments are shown as being generally cylindrical, they may be of any desired shape with cross-sections of any suitable geometrical shape such as square, rectangular or polygonal. The cavity 28 and the rim or belt gripping projection would be shaped to match the cross-sectional configuration of the type of abutment chosen for use. Thus, when using a square shaped abutment, the cavity 28 would be in the form of a truncated pyramid and the rim 29 would be in the form of a square.

In actual use, the belt 40, as shown in FIG. 1 could be 10 inches in width. The cleat 20 could be 8 inches long, 1 inch high, 1 inch inverted base, i.e., 1 inch in width, and having a truncated apex 21 of one fourth inch in width. The center line distance of the abutments could be six inches.

These cleat dimensions may be varied as described for particular purposes. Practically, the height may be varied from one half inch to three or four inches; the greatest width is usually constant at about 1 inch; the diameter of the abutment is generally about 1 inch; the diameter of the rim or belt gripping projection may be about seven eighths of an inch; the overall length may vary depending upon the width of the belt to be used; and the center line distance of the abutments may be varied to suit the prospective load to be conveyed.

The mode of application of the cleat to the belt is more or less obvious. Subject to the center line distances of the abutments on the cleat to be used, a row of transverse holes are drilled, punched, or otherwise formed in the belt. The cleat is then positioned on the belt with its threaded holes lined up with the holes in the belt. Compression screw 50 is assembled with its dished washer 60, either the pronged or the prongless type depending on the use, and the end of the screw is introduced through the belt into the insert; the screw being guided thereinto by the chamfered counterbore 37. The wrench is then inserted into the socket 54 and the screw and washer driven home until the washer and flat head of the screw are embedded into the lower surface of the belt. This latter condition is, of course, necessary so that neither the head of the screw nor the washer contact the pulley over which the belt travels. As the screw head and washer are embedded into the lower belt surface, the compressive forces on the cleat abutment and belt rapidly build up; rim 29 is pulled slightly down into the upper surface of the belt, depending upon the hardness of the belt material and the elastomer of the cleat material, and then forced slightly outward to create the seating seal previously described.

While the inserts 32 have been described as being made from any suitable material, in practice, when molded rubber, natural or synthetic, is used for the body of the cleat, brass inserts are used as brass seems to bond better to the rubber and hence the combination of brass insert molded into the rubber abutment allows the use of a greater compressive force as set-up by the compression screw.

While I have described my invention generally with relation to a preferred embodiment thereof, it should be understood that modifications may be made thereto by those skilled in the art. Such modifications might consist in changing the shape of the segmented head of the compression screw and the shape of the dished portion of the washer used therewith. These heads could be square, triangular or other polygonal shape so long as the dished portion of the washer is shaped similarly thereto, thus enforcing the washer first, to turn with the screwhead and then, secondly, to prevent the screw from rotating counter clockwise after the washer is embedded in the lower belt surface. Conceivably, if the screw head is shaped into the form of a triangle, the dished portion of the washer could be hexagonally shaped which would accomplish the purpose mentioned above. All such modifications are intended to be included within the scope of the appended claims.

Having thus described and illustrated my invention, I claim:

1. A detachable conveyor belt cleat comprising, in combination:

a molded cleat of resilient material having a generally triangular cross-section, said cross-section being taken normal to the longitudinal axis of said cleat, said triangular cleat having an inverted, truncated apex disposed next to the planar surface of said belt, a vertical side normal to the plane of said belt surface, an inclined side making an acute angle with said belt surface and an inverted base whose plane is parallel to that of the belt surface whereby as the belt is caused to travel in one direction, the normal vertical side of the cleat is the load bearing surface and when the belt is caused to travel in the reverse direction, the inclined side of the cleat and the adjacent belt surface form a pocket for transporting suitable material;

abutment means molded at intervals into said cleat, the axes of said abutment means being normal to said longitudinal axis;

each of said abutment means having a base adapted to grip the upper surface of said belt and form a seal therewith;

threaded inserts molded into said abutments, the axis of said inserts being co-axial with the axes of said abutment means;

a plurality of apertures in said belt; and self-locking fastening means extending from the lower surface of said belt through said apertures and into said inserts whereby said cleat is secured to said belt.

2. A detachable conveyor belt cleat as claimed in claim 1 wherein said abutments are cylindrical and have a diameter comparable to the width of said inverted base of said cleat.

3. A detachable conveyor belt cleat as claimed in claim 1 wherein said self-locking fastening means comprises said threaded insert having a threaded bore, a segmented head compression screw extending through said belt from the lower surface thereof into said insert, and a dished washer having a raised portion positioned between said lower belt surface and said segmented head of said compression screw, said raised portion being of a similar configuration to that of the segmented head whereby, when said screw is screwed into said threaded insert, said segmented head and said washer are embedded in the lower surface of said belt and said screw is prevented from unscrewing by the friction between said washer and said belt.

4. A detachable conveyor belt cleat as described in claim 3 wherein said washer is provided with a plurality of prongs adapted to extend from said washer into said belt whereby said washer is largely prevented from rotating after it has been embedded in the lower surface of said belt.

5. A detachable conveyor belt cleat as claimed in claim 3 wherein said threaded insert is provided with a threaded bore and a finned exterior, concentric with said bore; an upper shallow counterbore concentric with said threaded bore for receiving a portion of said molded cleat material therein and said cleat is provided with a cavity just above the upper extremity of said threaded bore, said cavity being of a diameter smaller than that of said threaded bore and said compression screw being a loose fit in the threaded bore of said insert whereby when said screw is screwed through said insert into said cavity, the molded material fills the protruding threads of said screw and prevents said screw from being easily unscrewed through the threaded bore of said insert.

6. A detachable conveyor belt cleat as claimed in claim 3 wherein said compression screw comprises a socket headed flat screw with a specially formed segmented head adapted to prevent, under the conditions of operational installation, any rotation of said screw in a direction causing it to disengage from said threaded insert, said screw being a loose fit into said threaded insert.

References Cited in the file of this patent

UNITED STATES PATENTS

| 2,809,743 | Hinchcliffe | Oct. 15, 1957 |
| 2,875,887 | Hinchcliffe | Mar. 3, 1959 |